Jan. 1, 1952 F. LYIJYNEN 2,581,195
TRIM PANEL AND METHOD OF MAKING THE SAME
Filed Sept. 11, 1948
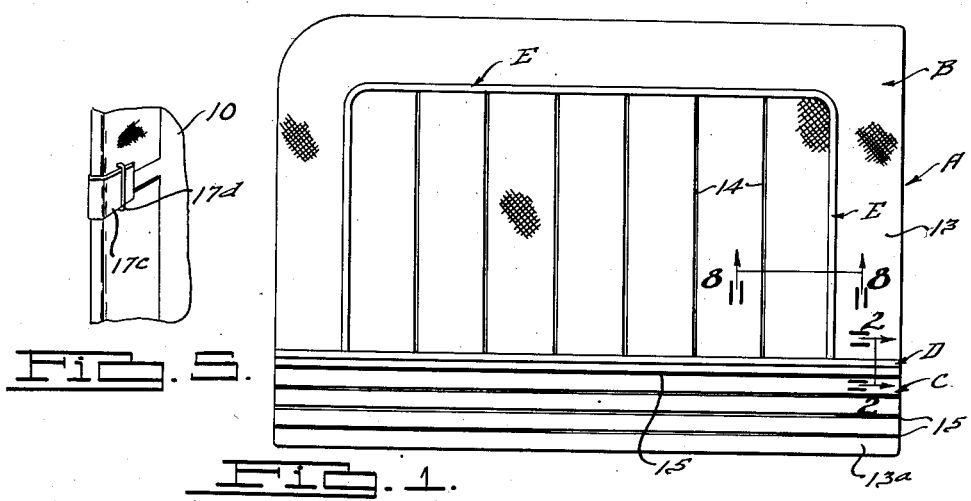
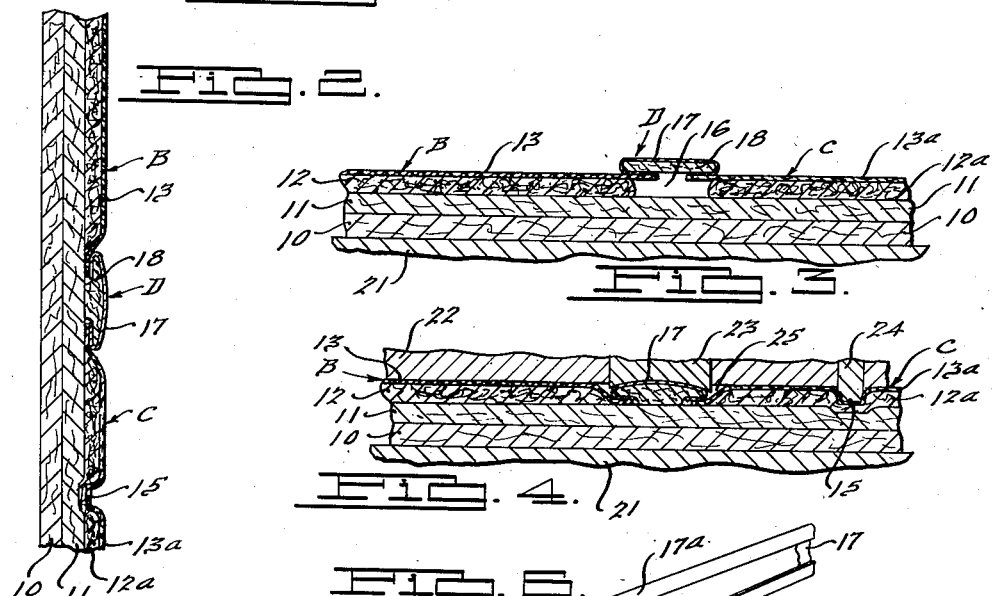
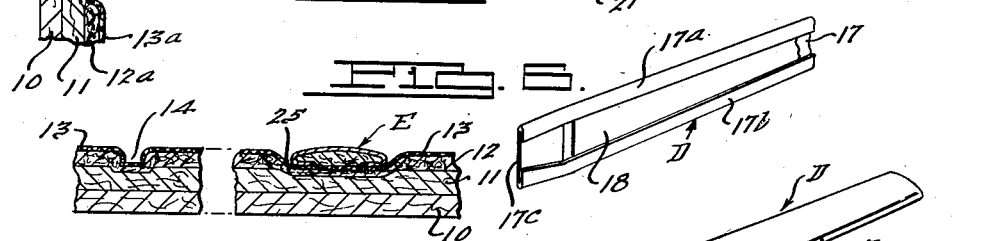
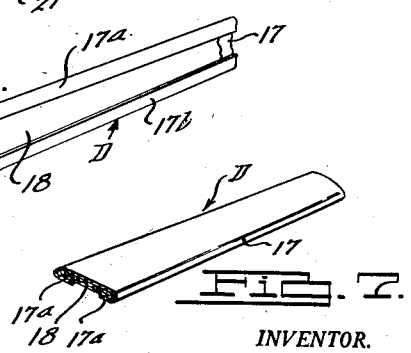
INVENTOR.
Fred Lyijynen
BY
Elmer Jamison Gray
ATTORNEY.

Patented Jan. 1, 1952

2,581,195

UNITED STATES PATENT OFFICE 2,581,195

TRIM PANEL AND METHOD OF MAKING THE SAME

Fred Lyijynen, Detroit, Mich., assignor to Briggs Manufacturing Company, Detroit, Mich., a corporation of Michigan Application September 11, 1948, Serial No. 48,838

8 Claims. (Cl. 154—106)

This invention relates generally to articles, such as trim panels, formed of laminations of sheet material bonded together, and is particularly useful in connection with panels utilized for trimming the interiors of automobile or other vehicle bodies. In the fabrication of panels or articles of the foregoing type it is frequently the practice to apply to the exposed faces of the articles moldings, medallions, names, etc. of bright metal, such as chromium or stainless steel, for decorative or display purposes. The present invention relates particularly to laminated panels or articles having such ornamental metal moldings or elements applied thereto and to improvements in the fabrication of such panels or articles.

In the manufacture of trim panels for automobile bodies, such as for finishing the insides of the doors thereof, it is customary to consolidate together the several panel laminations in a press between heated platens or dies and thereafter apply the metal moldings to the panel and attach them in place at the desired locations. One conventional type of molding comprises a channel piece having an outer bright finish and a specially formed metal insert or strip interlocked in the channel and formed with lanced out prongs or fasteners. In order to attach such a molding to the panel the latter must be pierced to provide holes spaced apart in accordance with the spacing of the prongs on the molding. When the molding is applied to the panel the prongs are passed through the holes in the panel and clinched over the back face thereof. Not only are these metal moldings relatively expensive but the assembly thereof with the panels is time consuming and costly due to the manual operations involved and the consequent delays in production.

An object of the present invention is to eliminate the use of separately applied metal moldings or elements of like nature used on the laminated articles for ornamental or display purposes, and to provide a laminated panel or article, and a method of making the same, in which the molding or like element is attached to the panel during the consolidation of the laminations thereof.

A further object of the invention is to provide a method and means whereby a metal molding or the like is secured to the panel by a bonding operation accomplished in the press simultaneously with the operation of bonding the panel laminations together.

Another object of the invention is to form the ornamental molding or like element of thin sheet metal, preferably having a gage as thin as any standard metal foil, and to bond this foil-like material directly to the panel through the medium of resinous material.

Still another object is to provide a molding which may be bonded to the panel during the press operation, such molding comprising a channel shaped metal strip, which may be foil-like in character, carrying an insert strip of resin impregnated material within the channel thereof, the molding being consolidated with the panel at least in part through the medium of the resin contained in the insert strip.

Other objects are to bond the metal molding strip to the panel through the medium of an interposed strip of resin impregnated material, to shape the molding to the desired contour during the press operation, to trim the edges of the molding strip during the operation of consolidating the panel laminations and molding strip together, and in general to produce panels or articles with ornamental metal moldings or the like in which the latter are applied in the same operation in which the panel laminations are united in the press.

Other objects of this invention will appear in the following description and appended claims, reference being had to the accompanying drawings forming a part of this specification wherein like reference characters designate corresponding parts in the several views.

Fig. 1 is a top plan view of a trim panel constructed in accordance with one embodiment of the present invention.

Fig. 2 is an enlarged fragmentary section taken substantially through lines 2—2 of Fig. 1 looking in the direction of the arrows.

Fig. 3 is an enlarged fragmentary section illustrating the component parts of the panel in their assembled relation prior to the consolidation thereof in a press.

Fig. 4 is a fragmentary sectional view illustratlustrating the operation of consolidating together the component parts illustrated in Fig. 3.

Fig. 5 is a fragmentary perspective view illustrating the manner in which one of the moldings is folded at its end around the edge of the panel and attached to the back thereof prior to the press operation.

Fig. 6 is a fragmentary perspective view of the underside of a composite molding constructed in accordance with one embodiment of the present invention.

Fig. 7 is a sectional perspective view of a portion of the molding.

Fig. 8 is an enlarged fragmentary section taken substantially through lines 8—8 of Fig. 1 looking in the direction of the arrows, and Fig. 9 is an enlarged fragmentary sectional view illustrating the component parts of Fig. 8 prior to the press operation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

For the purposes of illustrating one manner in which the invention may be utilized there is illustrated in Fig. 1, by way of example, a trim panel A of the type which may be used as finish trim on the inside of an automobile body, such as on the door thereof, this panel forming a part of the decorative interior trim of the body. Trim panels of this type are frequently fabricated with a main upper area B, which may be covered with fabric or cloth with an underlying layer of padding, and a lower rather narrower area C, often termed a kick-pad, which may also be padded and covered usually with a layer of more durable material, such as carpeting or imitation leather, or covered with a layer of fabric of different color, appearance or characteristics than the upper layer covering the area B. In connection with these panels it is often the practice to attach ornamental metal moldings to the face of the panel and, accordingly, the panel A is shown with an ornamental molding D secured along the juncture of the areas B and C and a second molding E secured to the area B, these moldings being formed and applied in accordance with any of the herein described embodiments.

Where the laminated article or panel, carrying the ornamental metal moldings or equivalent elements, is used for the purposes of interior trim of automobile or other vehicle bodies, the panel is preferably, although not necessarily, fabricated in accordance with my copending application Serial No. 16,706, filed March 24, 1948. In general the trim panel made in accordance with the present invention comprises a stiff foundation board 10, a relatively thick paper sheet 11 overlying the foundation board, a layer of padding or wadding 12 superimposed upon the sheet 11, and an outer facing sheet or covering layer 13. Where, as in the present instance, the trim panel is divided into the above mentioned areas B and C, the covering 13 for the area B preferably comprises a cloth or fabric material. The covering for the kick-pad area C may also have a padding or wadding layer 12a overlying the sheet 11 and covered with a suitable fabric material or sheet 13a which may, as stated above, be in the form of carpeting or imitation leather or other desired material.

As in my above mentioned application the foundation 10 and sheets 11, 12 and 13 as well as sheets 12a and 13a are assembled in superimposed relation as shown in Fig. 3, and these laminations are subjected to a pressing operation during which they are heated under pressure and consolidated or unified so as to unite the laminations together. In the present instance the laminations are in part secured or bonded together along ornamental lines defined by relatively deep indentations or grooves, such as the vertical grooves 14 in the upper area B of the panel and the longitudinal grooves 15 in the kick-pad area C of the panel. The arrangement of these grooves or indentations, as shown in Fig. 1, is purely for illustrative purposes, as it will be apparent that the lines or localities at which the laminations are pressed together so as to effect the bond may be varied as to configuration or otherwise in order to produce any desired pattern or design.

In assembling the laminations to provide the areas B and C of the panel the foundation 10 and paper sheet 11 may be continuous to provide a backing corresponding to the full area of the panel. The padding layers 12 and 12a as well as the fabric or covering layers 13 and 13a are applied as separate sheets in the embodiment of Fig. 3 and there may be a gap or space 16 therebetween which may vary considerably in width, the size of this space or gap being shown merely for illustrative purposes in Fig. 3. The gap or space between the layers 12 and 13 and the layers 12a and 13a is closed by means of the ornamental molding D which, as later described, is attached permanently in place by a bonding operation with the application of heat and pressure during the operation of forming the indentations or grooves 14 and 15. Thus, in the assembly of the component parts of the panel, preparatory to the press operation, the molding D is placed in position in a manner generally similar to that illustrated in Fig. 3. Also, in the assembly of the component parts, preparatory to the press operation, the molding E is placed in position upon the panel so as to engage the fabric layer 13 covering the upper area B of the panel, as shown in Fig. 9.

The foundation sheet or board 10 is preferably formed from a rigid stiff board material providing the desired support for the remaining laminations of the panel. In some instances the material of the foundation board or sheet 10 may be made moisture resistant by impregnation with a resin or an asphalt or bituminous material. However, in the present instance the trim panel, as intended for use on the interior of an automobile body, may utilize a heavy composition fibre board, such as Masonite board, which is not impregnated or treated for moisture resistant purposes.

The resinous or bonding material used for consolidating together the laminations of the trim panel along the lines 14 and 15 is in the present instance contained entirely in the sheet 11. In the embodiment of Figs. 1 to 9 inclusive the resinous or bonding material for uniting the laminations together at the localities of the moldings D and E is contained in part in the sheet 11 and in part in the composite molding element, as later more fully described. The sheet 11 preferably comprises a low density absorbent sheet of cellulosic material, such as alpha cellulose or pulp paper, which is not only highly absorbent but also compressible under the action of the die during the hot pressing operation. This sheet is treated or impregnated with a bonding substance preferably in the form of a thermoplastic or thermosetting resin, such as a phenol formaldehyde product, or any known phenolic resin, or a urea formaldehyde resin. Where a resin of this character is used as the bonding agent it is preferred to convert the resinous substance into a varnish by dissolving it in a suitable solvent. The sheet 11 may be impregnated by immersing it in the varnish so that the fibers of the sheet will become saturated. By controlling the percentage of resin contained in the varnish the desired amount of resin introduced into the sheet 11 may be readily controlled in order to produce the desired bonding action without the presence of excess resin. After impregnation the sheet 11 is dried so as to expel the volatile solvents from the sheet, the resinous material remaining in the sheet being partially reacted or polymerized so as to be capable of further reaction or curing when subjected to heat from the heated platens or dies during the pressing operation.

The wadding or padding layer 12, 12a comprises any suitable soft deformable material capable of being employed for cushioning the outer surface of the panel. Cotton batting or multiple layers of crepe paper may be used satisfactorily for this purpose. The outer covering layers 13 and 13a may be made of any suitable finishing material, such as those hereinbefore mentioned. Although I prefer to utilize the compressible sheet 11 for carrying the resin or bonding material, since this sheet will readily take impressions from the die, it will be understood that the sheet 11 in some instances may be dispensed with and the bonding material applied directly to the layers of padding or wadding 12 and 12a or to the foundation board 10.

The moldings D and E, in the embodiment of Figs. 1 to 9 inclusive, are preferably similar in construction, each being in the form of a composite strip comprising an outer metal strip in channel form carrying an insert strip preferably treated or impregnated with a bonding substance compatible with the bonding substance contained in the sheet 11. Thus, the molding D comprises a thin channel shaped metal strip 17 of preferably bright metal within which a strip 18 is confined. The metal strip 17 may be wrapped or folded snugly around the edges of the insert strip 18, which operation may be accomplished in any automatic machine, thereby providing folded portions 17a and 17b underlying and engaging the bottom of the strip 18 and spaced apart a suitable distance to expose a predetermined area of the strip 18 at the underside of the molding. It will be understood that the metal strip 17 may first be formed in channel shape after which the strip 18 is inserted into the channel. Since the molding D extends the full width of the panel, I prefer to provide the metal strip 17 with extensions 17c beyond the ends of the insert strip 18, so that after placing the molding D in place the extensions 17c at opposite ends of the molding may be folded around the side edges of the panel and anchored to the underside of the foundation sheet 10 by means of staples 17d, see Fig. 5.

The molding E is similar to the molding D in that it also comprises a thin channel shaped metal strip 19, preferably of bright metal, within which is confined an insert strip 20 similar to the strip 18. Since the ends of the molding E do not extend to the edges of the panel, the metal strip 19 has the same length as the insert strip 20.

The metal strips 17 and 19 of the moldings D and E are preferably quite thin and foil-like in character. Metal foil having gages ranging from approximately .001 of an inch to approximately .005 or .006 of an inch have proved satisfactory and the foil material employed may be of any suitable metal having a chromium finish or a bright colored finish or may be of stainless steel, or any other bright metal suitable for decorative purposes. The insert strips 18 and 20 may be of any suitable thickness and are preferably formed of the same paper or pulp material as the sheet 11, and these insert strips are preferably treated or impregnated with a bonding agent which may be similar to the bonding agent contained in the sheet 11. It will be seen that when the composite moldings D and E are placed in position as indicated in Figs. 3 and 9, predetermined areas of the impregnated insert strips 18 and 20 will be exposed between the turned-under folds or flanges of the metal strips 17 and 19. With the component parts of the panel in assembled relation the assembled unit is introduced into a suitable press for the purpose of consolidating all of the parts together. The press, which is preferably of the hydraulic type, is provided with heated lower and upper platens or dies 21 and 22. The upper platen 22 is provided with a die member 23 suitably shaped and of a size to engage the molding D over the full length thereof. The platen is also provided with a similar die engaging the molding E over the full length thereof, and is also provided with die members 24 for forming the indentations or grooves 14 and 15. When the press is closed the relatively deep indentations 14 and 15 are formed, and since the resin impregnated sheet 11 is relatively thick and compressible these grooves or indentations extend partially into this sheet, as illustrated in Figs. 2, 4 and 8, the wadding or padding being compacted at the locality of the indentations. Along these lines of indentation 14 and 15 the resinous material in the sheet 11 will flow through the compressed wadding or padding material 12, 12a and will penetrate to some extent the top covering layers 13, 13a along the base of the indentations sufficiently so as to thoroughly consolidate these layers together at these localities. In addition, the resinous material will effect a permanent bond between the fabric, wadding layers and the foundation board 10 in the locality of the grooves or indentations 14 and 15 where pressure is applied by the dies. During the press operation the temperature and pressure will be so regulated that the resinous material in the sheet 11 is cured or brought to a final stage of reaction or polymerization. As a consequence, the layers of the panel will be securely and permanently bonded together upon completion of the curing or reaction of the resin while substantial areas of the panel between the lines of indentation 14 and 15 will remain uncompressed so as to give the panel as a whole a soft upholstered effect.

During the press operation the die members 23 engage the molding strips D and E and force them into the panel by compressing the underlying portions of the padding and also by compressing to some extent the relatively soft paper sheet 11. During this operation the resinous material in the strips 18 and 20 effect a permanent bond between the strips and the outer foil-like metal strips 17 and 19. Furthermore, the resinous material in the insert strips 18 and 20 flows and merges with the resinous material in the sheet 11, thus effecting a permanent bond therebetween. Also, the resinous material in the insert strips and in the sheet 11 permanently bond the edges of the moldings to the underlying portions of the fabric materials 13 and 13a as well as the underlying portions of thhe padding material. The compressive forces applied to the moldings D and E produce impressions or channels 25 within which the moldings are confined so that the upper surfaces thus may lie substantially or nearly flush with the upper adjacent surfaces of the panel. By thus depressing the moldings into the upper surface of the panel a more desirable appearance is achieved and by consolidating the parts of the moldings to the underlying portions of the panel the moldings become permanent substantially integral parts of the panel incapable of coming loose during use. By using a foil like metal in the fabrication of the moldings a very efficient bonding action between the metal foil and the insert strip is obtained which is permanent in character, and by rolling or folding the metal foil underneath the edges of the insert strip, as shown at 17a and 17b, ease in assembly is achieved, since the composite strip may be stored, transported and handled readily, while also enabling the edge of the metal foil to be entirely concealed. The dies 23 may be shaped to any suitable contour in order to impart to the top of the molding a corresponding contour, such as a crowned or angular effect. It is thus possible to press or contour the molding in any desired manner during the pressing operation.

I claim:

1. A molding adapted to be bonded to the face of a trim panel, comprising a thin strip of material treated with a bonding substance effective to form a bond under heat and pressure and a thin metal strip covering said treated strip and having its edges folded tightly around and beneath the edges of the treated strip and pressed into contact therewith to provide a pre-formed unitary molding which is pliable and readily bendable, the folded edges of said metal strip being spaced apart beneath the treated strip to provide an exposed bonding area capable of contact with and being bonded to the face of the trim panel upon the application of heat and pressure to the molding.

2. A molding adapted to be bonded to the face of a trim panel, comprising a thin strip of material treated with a bonding substance effective to form a bond under heat and pressure and a thin metal strip covering said treated strip and having its edges folded tightly around and beneath the edges of the treated strip and pressed into contact therewith to provide a pre-formed unitary molding which is pliable and readily bendable, the folded edges of said metal strip being spaced apart beneath the treated strip to provide an exposed bonding area substantially flush with the adjacent folded edges of the metal strip and thereby capable of contact with and being bonded to the face of the trim panel upon the application of heat and pressure to the molding.

3. A molding adapted to be bonded to the face of a trim panel, comprising a thin strip of material treated with a bonding substance effective to form a bond under heat and pressure and a thin metal strip covering said treated strip and having its edges folded tightly around and beneath the edges of the treated strip and pressed into contact therewith to provide a pre-formed unitary molding which is pliable and readily bendable, the folded edges of said metal strip being embedded in the treated strip thereby to provide for bonding contact between said exposed area and the face of the trim panel upon the application of heat and pressure to the molding.

4. In combination, a laminated panel including a top sheet and an ornamental member bonded to the outer face of said sheet, said member being pre-formed to comprise a thin fibrous layer of absorptive material treated with a bonding substance—effective to form a bond under heat and pressure; and a thin metallic layer covering said fibrous layer and having the edges thereof folded around and beneath the fibrous layer into contact therewith to connect said layers together as a unit, said edges being spaced apart a sufficient distance to provide for contact between the bottom surface of said fibrous layer and the upper surface of said top sheet in the area between the folded edges of said metallic layer, said top sheet and said fibrous layer being bonded together within said area through the medium of said bonding substance.

5. In combination, a laminated panel including a top sheet, an underlying padding sheet and an ornamental member bonded to the outer face of the panel, said member being pre-formed to comprise a thin layer of absorptive material treated with a bonding substance effective to form a bond under heat and pressure and a thin metallic layer covering said layer of absorptive material and having the edges thereof folded around and beneath the absorptive layer into contact therewith to join said layers together as a unit, said folded edges being spaced apart a sufficient distance to provide an exposed bonding area capable of contact with and being bonded to the face of the panel by the application of heat and pressure to the member, said ornamental member being embedded in said sheets.

6. A laminated panel and a molding mounted upon the outer face thereof, said molding comprising an insert strip of absorptive material—treated with a bonding substance effective to form a bond under heat and pressure and a metal strip covering the insert strip and pre-formed to have the edges thereof folded tightly around and beneath the insert strip to dispose the bottom of the insert strip substantially flush with the bottom of said folded edges in the area therebetween, said folded edges being spaced apart to provide an area of contact between the bottom of the insert strip and the top of the panel, said insert strip being bonded in said area to the panel, and the ends of said metal strip being folded around the edges of said panel and secured to the underside thereof.

7. A laminated panel and a molding mounted upon the outer face thereof, said molding comprising an insert strip of absorptive material treated with a bonding subtance effective to form a bond under heat and pressure and a metal strip covering the insert strip and pre-formed to have the edges thereof folded around and beneath the insert strip into contact therewith, said folded edges being spaced apart to provide an area of contact between the bottom of the insert strip and the top of the panel, said insert strip being bonded in said area to the panel through the medium of said bonding substance, and the ends said metal strip being folded around the edges of said panel and secured to the underside thereof.

8. The method of applying a metallic molding to a laminated structure including the steps of placing on said structure an insert strip treated with a bonding substance effective to form a bond under heat and pressure and a metallic strip covering the same and preformed to have the edges thereof folded around and beneath the edges of the insert strip with a bottom area of the latter exposed and confronting the upper surface of said structure between said folded edges, and pressing said strips as a unit against said structure to effect contact of the insert strip in said area with said upper surface of said structure and to bond the insert strip to said structure.

FRED LYIJYNEN.

(References on following page)

REFERENCES CITED

The following references are of record in the file of this patent:

UNITED STATES PATENTS

| Number | Name | Date |
|---|---|---|
| 1,819,270 | Shakespeare | Aug. 18, 1931 |
| 1,838,102 | McGovern | Dec. 29, 1931 |
| 1,972,307 | Loetscher | Sept. 4, 1934 |
| 1,975,062 | Johannsen | Sept. 25, 1934 |
| 2,134,496 | Zinser | Oct. 25, 1938 |
| 2,145,068 | Batcheller | Jan. 24, 1939 |
| 2,306,256 | Wickwire et al. | Dec. 22, 1942 |
| 2,313,787 | Vaughn | Mar. 16, 1943 |
| 2,349,140 | Bolen et al. | May 16, 1944 |
| 2,401,987 | Taylor et al | June 11, 1946 |
| 2,415,881 | Heftler | Feb. 18, 1947 |